July 18, 1961  D. L. BLACHLY  2,992,715
READILY SEPARABLE TORQUE TRANSMITTING COUPLING
Original Filed Aug. 27, 1959  2 Sheets-Sheet 1
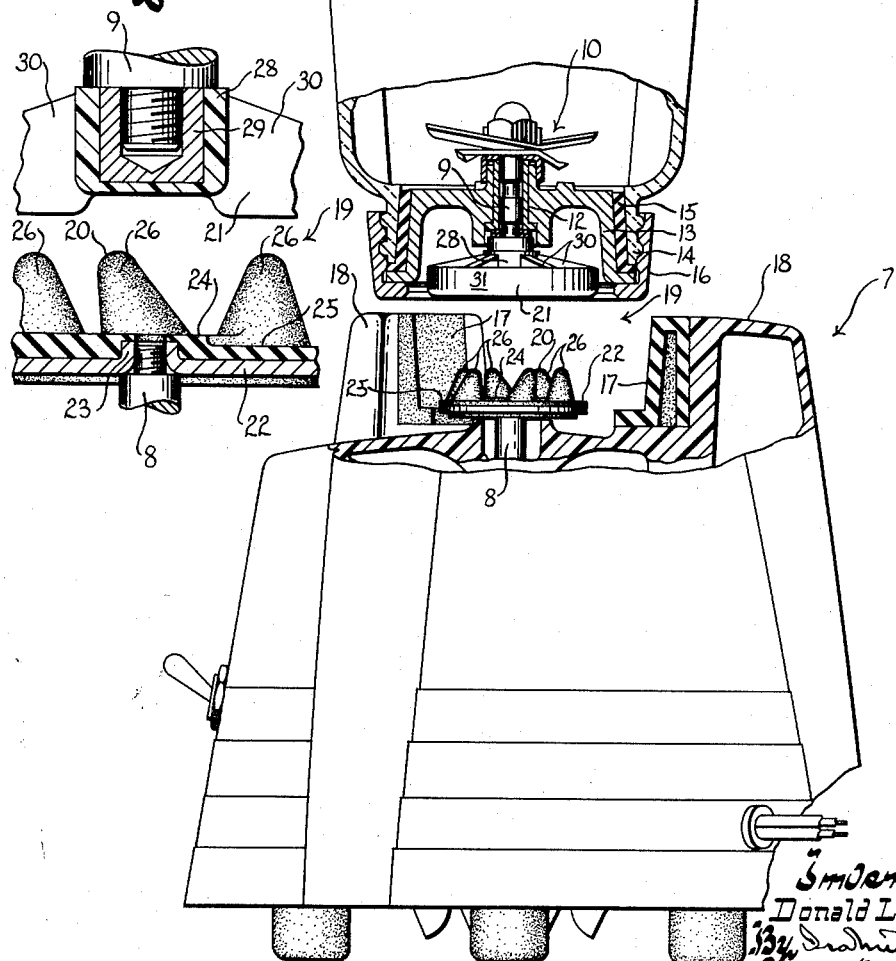
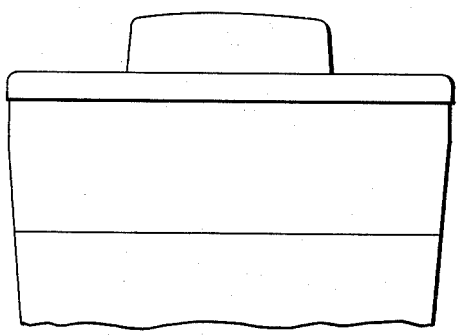
Donald L. Blachly July 18, 1961  D. L. BLACHLY  2,992,715
READILY SEPARABLE TORQUE TRANSMITTING COUPLING
Original Filed Aug. 27, 1959  2 Sheets-Sheet 2
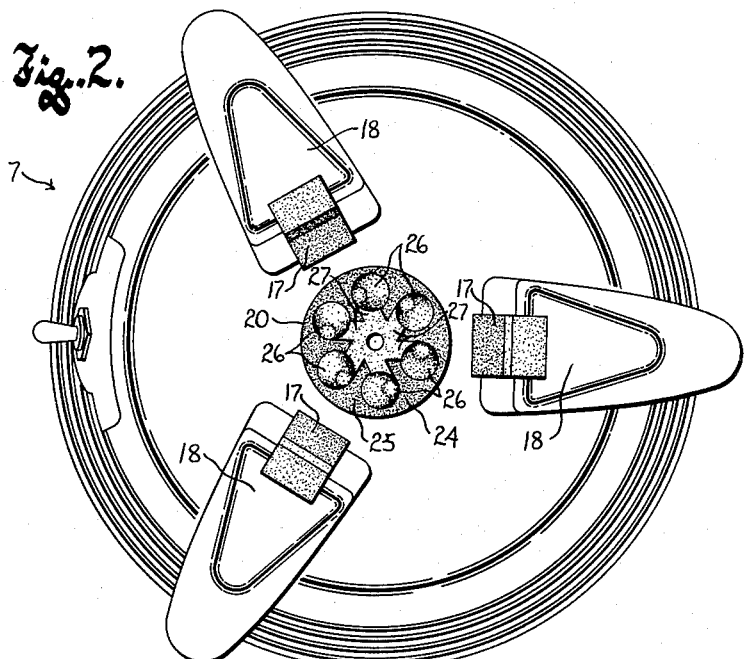
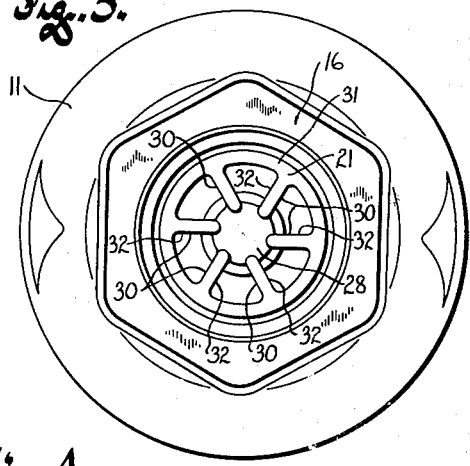
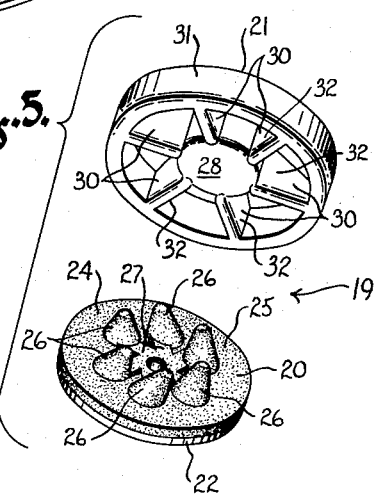
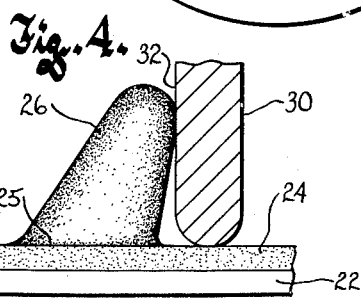
Inventor
Donald L. Blachly
By
Attorney

2,992,715
READILY SEPARABLE TORQUE TRANSMITTING COUPLING

Donald L. Blachly, Milwaukee, Wis., assignor to John Oster Manufacturing Co., Milwaukee, Wis., a corporation of Wisconsin
Original application Aug. 27, 1959, Ser. No. 836,459. Divided and this application Feb. 4, 1960, Ser. No. 6,734
1 Claim. (Cl. 192—67)

This invention relates broadly to readily separable torque transmitting connections and refers more particularly to a driving connection for coupling the agitator shaft of a food comminuting or blending machine to its motor-driven drive shaft.

The copending application, Serial No. 836,459, filed August 27, 1959, of which this application is a division, affords a complete disclosure of the class of food comminuting and blending machines for which the coupling device of this invention is specifically intended. For information concerning coupling devices previously available for this purpose, reference may be had to the Reissue Patent No. Re. 24,607, granted February 24, 1959, to A. W. Seyfried.

In food comminuting and blending machines which require a readily separable driving connection, the drive motor is housed within the base of the machine, with its drive shaft protruding vertically through the top thereof to be drivingly coupled to the shaft of the agitator. The agitator shaft is journalled in the bottom of a mixing vessel, removably seated on top of the base. Absolute coaxiality between the motor shaft and the agitator shaft is, therefore, unlikely, to say the least. Hence, the coupling by which the driving and driven shafts are connected must be sufficiently flexible to accommodate some misalignment between the shafts.

Also, since the machines for which this invention is intended are household appliances, and used for the most part by women, they should be as quiet in operation as possible. Obviously, therefore, the coupling should not be noisy, nor should it have vibration producing play which, if present, multiplies the vibration resulting from the action of the agitator blades upon the vessel contents, and causes the machine to travel, i.e. hop about on the counter top. On the contrary, the coupling should be positive when engaged, and sufficiently resilient to absorb agitator produced vibration.

The coupling of this invention meets all these objectives.

The purpose and object of this invention thus is to provide a readily separable torque transmitting coupling which will provide a smooth, positive drive from the motor shaft to the agitator shaft, which is quiet and efficient in operation, and rugged enough to stand up under conditions which often border on abuse.

It is also an object of this invention to provide a readily separable torque transmitting connection of such simple design and construction that it may be easily and inexpensively produced.

With the above and other objects in view which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

The accompanying drawings illustrate one complete example of the physical embodiment of the invention constructed according to the best mode so far devised for the practical application of the principles thereof, and in which:

FIGURE 1 is a side view of a food comminuting and blending machine equipped with the coupling of this invention, with the mixing vessel shown lifted off the motor base, and with the adjacent portions of the vessel and base broken away and in section to better illustrate the coupling;

FIGURE 2 is a top plan view of the base;

FIGURE 3 is a bottom view of the mixing vessel;

FIGURE 4 is a fragmentary detail view partially in section and partially in elevation, illustrating an important feature of the invention;

FIGURE 5 is a perspective view of the driving and driven elements of the coupling shown separated from the shafts to which they are attached in use; and FIGURE 6 is a detail sectional view through the hub portions of the driving and driven coupling elements, to show the manner in which they are secured to their respective shafts.

Referring now particularly to the accompanying drawings, the numeral 7 designates generally the base of a food comminuting and blending machine identical to that which forms the subject matter of the aforesaid copending application Serial No. 836,459, filed August 27, 1959. The base 7 houses a drive motor (not shown) the shaft 8 of which projects up through the top of the base to be drivingly coupled to the shaft 9 of an agitator in the bottom of a mixing vessel 11 when the mixing vessel is properly placed on the base.

The agitator 10 comprises a plurality of mixing blades fixed to the shaft 9 which is journalled in a bearing 12 centrally fixed in a removable closure 13 for the bottom of the mixing vessel. The removable bottom 13 telescopes into a neck 14 at the bottom of the jar which provides the body of the mixing vessel, with a suitable resilient gasket 15 therebetween, and it is held in place by a collar 16 threaded onto the neck 14.

As shown in FIGURE 3, the collar 16 is hexagonal in external outline and, when in place on the base, seats upon three resilient L-shaped pads 17 fixed to bosses 18 which project from the top of the base. As more fully explained in the aforesaid copending application, the reception of the six-sided collar 16 by the three L-shaped pads holds the mixing vessel against rotation in an upright position with its agitator shaft coupled to the motor shaft in as good alignment therewith as can be expected under the circumstances, while still leaving the mixing vessel free for quick and easy removal from the base.

The coupling by which the motor shaft and the agitator shaft are separably connected, indicated generally by the numeral 19, comprises a driving element 20 and a driven element 21. The former consists of a rigid metal disc 22 having an extruded hub 23 at its center which is tapped to have threaded engagement with the end of the shaft 8, as clearly shown in FIGURE 6, and a rubber molding 24 vulcanized or otherwise bonded to the top face of the disc.

The rubber molding 24 has a flat disc-like base 25 coextensive with the disc 22, and six resilient equispaced tits 26 which project up from the base at equal distances from the axis of the coupling. Each of the tits is substantially conical, but has its axis inclined to the plane of the base 25 and the disc 22 in the direction of shaft rotation, so that an upright line on the front surface of the tit leans slightly forward, i.e. in the direction of rotation. This condition is best illustrated in FIGURE 4. Preferably the rubber molding 24 has reinforcing spokes 27 which rise slightly above the top of its base 25 and extend from the hub of the molding to each tit.

The driven element 21 of the coupling is essentially a wheel, preferably molded of thermoplastic material or the like, and has a hub portion 28 with a metal insert 29 therein. The insert 29 has a tapped bore extending down from the top thereof, which has threaded engagement with the adjacent lower end of the agitator shaft 9, as clearly shown in FIGURE 6.

Six spokes or arms 30 radiate from the hub 28 and a rim 31 connects the outer ends of these spokes or arms. Attention is directed to the specific shape and disposition of the spokes or arms. As best seen in FIGURE 3, each spoke or arm has a flat side 32 lying in a plane containing the agitator shaft axis and extending radially therefrom. Since there are six spokes or arms, there is of course one for each of the tits 26, and the arms or spokes, or at least their flat sides 32, are angularly equispaced. Hence, when the two coupling elements are coaxially juxtaposed and engaged as a result of the mixing vessel being placed upon the motor base, and torque is being transmitted, each tit has substantially a line of contact along its front or leading surface with the flat side 32 of the arm or spoke in front of it.

In the event of misalignment between the driving and driven members, or if for some other reason certain of the tits engage their respective spokes or arms before the others do, the first to engage will yield and permit the remaining tits to contact their respective spokes or arms and pick up their share of the load.

This resilient displacement of the tits is facilitated by the slight forward inclination of their leading edges 26', since the apex portions of the tits are obviously the most yieldable portions thereof.

The forward inclination of the tits also has the advantage of increasing the frictional grip between the driving and driven coupling members, and thus resisting axial separation thereof while torque is being transmitted.

The degree to which the tits are inclined is not critical, except that it should not be excessive; and, of course, in no event would it be desirable to have the leading edges of the tits slant back from true perpendicularity. Such reclination would result in the stiffest portions of the tits—namely, their base portions, being the first to pick up the torque load. Resilient deformation of the tits to enable all of them to share the load would be unlikely under the circumstances.

While the relative disposition of the driving and driven elements shown and described has been found entirely satisfactory and, in fact, preferable, it should be understood that the two could be interchanged, i.e. the spoked wheel could be the driving element and the disc with the tits could be the driven element. In either case, the tits would be inclined as shown to assure the torque load being picked up first by the outer ends of the tits.

In conclusion, may it be said that this invention provides a very satisfactory and efficient readily separable torque transmitting connection, especially well adapted to coupling the motor shaft of a food comminuting and blending machine, with its agitator shaft and that the success of the invention no doubt lies in its combination of the conical inclined resilient tits with the flat unyielding or rigid spokes engaged thereby during torque transmission.

What is claimed as my invention is:

A readily separable torque transmitting coupling by which rotation may be transmitted from a drive shaft to a driven shaft when said shafts are placed in endwise substantially coaxial juxtaposition, said coupling comprising: complementary rigid and yieldable coupling members, each secured to an end portion of one of said shafts for rotation therewith; the rigid coupling member having a hub portion and a plurality of rigid arms radiating therefrom, each of said arms having a surface substantially radial to the shaft axis and said surfaces of the arms being angularly equispaced; the yieldable coupling member comprising a rigid disc having an axially outer face which is substantially normal to the axis of the shaft to which said yieldable coupling member is secured, which outer face is contiguous to the rigid coupling member when the coupling members are engaged; and a plurality of resilient conical tits secured at their bases to the axially outer face of said disc and projecting into the spaces between said rigid arms when the coupling members are engaged, there being one of said tits for each of said rigid arms, and said tits being equispaced from one another and from the shaft axis, each of said tits having its axis inclined to said axially outer face of the disc and having a leading surface disposed at an acute angle to the outer face of the base leaning towards the radially disposed surface of the rigid arm with which the tit engages during the transmission of torque by the coupling, so that initial engagement between the tit and said surface on the arm takes place at the outermost resilient portion of the tit whereby each tit can resiliently yield in response to load imposed upon it by its cooperating arm to enable other tits to engage their respective arms in the event of slight misalignment of the axes of the two coupling members.

References Cited in the file of this patent

UNITED STATES PATENTS

| 2,083,037 | Schmittgen | June 8, 1937 |
| 2,755,900 | Seyfried | July 24, 1956 |
| 2,930,596 | Waters | Mar. 29, 1960 |